(12) United States Patent
Robson et al.

(10) Patent No.: US 8,312,485 B2
(45) Date of Patent: Nov. 13, 2012

(54) SYSTEM, METHOD AND COMPUTER PROGRAM PRODUCT FOR SELECTIVE FILTERING OF OBJECTIONABLE CONTENT FROM A PROGRAM

(75) Inventors: Gary D. Robson, Belfry, MT (US); James D. Gee, Trenton, GA (US)

(73) Assignee: Caption TV, Inc. (CA)

( * ) Notice: Subject to any disclaimer, the term of this patent is extended or adjusted under 35 U.S.C. 154(b) by 514 days.

(21) Appl. No.: 12/102,430

(22) Filed: Apr. 14, 2008

(65) Prior Publication Data
US 2009/0049467 A1 Feb. 19, 2009

Related U.S. Application Data

(63) Continuation of application No. 10/187,540, filed on Jul. 2, 2002, now Pat. No. 7,360,234.

(51) Int. Cl.
*H04N 7/16* (2011.01)
*H04N 7/173* (2011.01)

(52) U.S. Cl. ........... 725/28; 725/14; 725/25; 725/39; 725/127; 725/136

(58) Field of Classification Search .......... 725/10, 725/14, 28, 32, 37, 39, 127, 136, 143; 348/553, 348/564
See application file for complete search history.

(56) References Cited

U.S. PATENT DOCUMENTS

| | | | |
|---|---|---|---|
| 5,610,653 A * | 3/1997 | Abecassis | 348/170 |
| 5,659,366 A | 8/1997 | Kerman | |
| 5,757,417 A | 5/1998 | Aras et al. | |
| 6,055,023 A | 4/2000 | Rumreich et al. | |
| 6,115,057 A | 9/2000 | Kwoh et al. | |
| 6,226,793 B1 * | 5/2001 | Kwoh | 725/28 |
| 6,314,569 B1 | 11/2001 | Chernock et al. | |
| 6,519,770 B2 * | 2/2003 | Ford | 725/28 |
| 6,850,252 B1 | 2/2005 | Hoffberg | |
| 7,124,303 B2 | 10/2006 | Candelore et al. | |
| 7,370,343 B1 * | 5/2008 | Ellis | 725/58 |
| 7,380,258 B2 * | 5/2008 | Durden et al. | 725/25 |

* cited by examiner

*Primary Examiner* — Kieu Oanh T Bui
(74) *Attorney, Agent, or Firm* — Katten Muchin Rosenman LLP

(57) ABSTRACT

A system, method, and computer program product is provided for the selective filtering of objectionable content from a program. The selective filtering of objectionable content from a program is accomplished by applying an encoding process and a decoding process to the audio and/or video signal of the program. The encoding process includes marking potentially objectionable material in the program with filtering information that identifies the type (e.g., audio, violent content, sexual content, etc.) and intensity level (e.g., mild, graphic, extreme, etc.) of the potentially objectionable material using filter codes. The decoding process includes comparing, during the presentation of the program to the user and prior to outputting the audio or displaying the video, the filtering information to filter criteria, which includes user supplied filter settings, to determine whether filtering of the potentially objectionable content (i.e., audio and/or video) should be performed. If filtering is to be performed, the objectionable content in the program is filtered according to the filtering information which, in the preferred embodiment, identifies the start and duration of the filtering and, for filtering of the video of the program, also identifies the display area of the video to be blocked.

55 Claims, 5 Drawing Sheets

SYSTEM, METHOD AND COMPUTER PROGRAM PRODUCT FOR SELECTIVE FILTERING OF OBJECTIONABLE CONTENT FROM A PROGRAM

This is a continuation application of U.S. application Ser. No. 10/187,540, filed Jul. 2, 2002 now U.S. Pat. No. 7,360,234, the entire contents and disclosure of which is hereby incorporated by reference.

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

BACKGROUND OF THE INVENTION

1. Field of the Invention

The present invention relates, generally, to the field of processing of audio and/or video signals, such as for example television broadcasts, movies, and other programs, and, more particularly, to a system, method and computer program for selective filtering of objectionable content from a program.

2. Discussion of the Background

It is a common desire of many viewers or listeners of television, movies, music, and other programs to filter portions of the audio and/or video of such programs. For example, many parents prohibit their children from watching cable television broadcasts, certain movies, or other programs because the audio of the program may include inappropriate language or the video may include inappropriate content, such as nudity, sexual content, or violence, that is unsuitable for children. In addition, since the parent has not seen the program, the parent may not know whether the content of the program is inappropriate for the children or not. Consequently, parents may inadvertently permit their children to view a program not knowing portions of it are inappropriate, or conversely, may prohibit viewing of the program even though its content does not include any inappropriate portions.

In an effort do solve this dilemma, the U.S. Federal Communications Commission ("FCC") has established provisions (EIA-608-B) for attaching parental guidelines ("ratings") to broadcasts using any of four different systems (U.S. TV, U.S. MPAA, Canadian English, and Canadian French). According to the FCC guidelines, however, only one rating may be applied to any given program and that rating may not change during the course of the program.

The inability to change the rating midway during the broadcast makes the FCC parental guideline system a "go or no-go" system. In other words, either the entire program is deemed appropriate or inappropriate depending on the rating. Consequently, while the rating system is helpful to parents in determining whether to permit the child to view the entire broadcast or program, it does not facilitate filtering of portions of the program to prevent viewers (e.g., children) from seeing or hearing particular portions of the program that are objectionable.

There are various prior art systems and methods that are based on or rely on the use of a government or industry-wide program rating system, such as the previously discussed rating system, that use a "V-chip" approach, or that use a proprietary rating system. See, for example, U.S. Pat. No. 5,485,518 to Hunter et al. Such systems are effective for blocking audio and/or video content that the user or viewer indicates should be blocked based on such content being associated with a specific rating. The specific ratings, however, are applied to an entire program and, as such, the systems that block audio and/or video content based on such ratings block or allow through the entire program. These systems are "go or no-go" systems, as discussed above. Either the entire program is deemed appropriate and let through, or inappropriate and blocked depending on the rating. There is no capability in such systems for allowing the user or viewer to watch a program, but to filter out objectionable material (audio or video).

Furthermore, many of the various prior art systems that provide for blocking of audio and/or video content require specialized hardware or additional components to perform the blocking function, such as audio-video devices that use dedicated circuitry, components, or chip sets. See, e.g., U.S. Pat. No. 5,828,402 to Collings; U.S. Pat. No. 4,554,584 to Elam; and U.S. Pat. No. 5,387,942 to Lemelson. While these systems are able to block content deemed to be objectionable by the viewer or user, the implementation of the blocking function is dependent on inclusion of the required hardware into the audio-video device. Such necessary hardware increases the cost of such equipment, makes upgrading or updating to improve functionality and/or to add features difficult and, in most cases, impossible, and severely limits widespread adoption and use.

U.S. Pat. No. 6,230,320 to Gakumura discloses a system and method for temporarily releasing viewing restriction in a television receiver employing a V-chip system. In order for the user to view the blocked program, the user must enter a viewing restriction release command to temporarily release viewing restriction based on the contents of a rating set. This entry results in the viewing restriction based on the contents of the set rating being invalid with the contents of the set rating held when the viewing restriction release command Is entered. The program can be reblocked by the user entering a viewing restriction return command to return the viewing restriction, which makes the viewing restriction based on the contents of the set rating valid. While this system provides a temporary way to unblock a previously blocked program, it does not provide the capability of allowing the user or viewer to watch a program, while filtering out objectionable material (audio or video).

U.S. Pat. No. 6,075,550 to Lapierre, which is hereby incorporated by reference, discloses a system that filters the closed caption and/or audio of a television program by comparing the words in the transmitted closed caption with a list of offensive words. When an offensive word is detected, the system will remove it from the closed caption stream so that it is not displayed on the television screen. Based on detection of the offensive word in the closed caption stream, the system mutes (i.e., turns off) the audio signal for a timed period. The system estimates the time at which it should start muting the audio and the length of the timed period. The disclosure indicates that the period of time for which the audio signal is turned off is flexible. A longer period during which the signal is turned off tends to decrease the chance of objectionable material getting through; however, this also tends to filter a greater amount of unobjectionable material. A shorter period during which the signal is turned off tends to have the opposite effect. The period of time for which the audio signal is turned off may also be a function of the word or phrase encountered. Where a particularly objectionable word, or particular lengthy objectionable phrase is encountered, the audio signal may be turned off for a relatively long period of time.

Similarly, where the word is less objectionable and does not involve a lengthy phrase, the audio signal may be turned off for a relatively short period of time. Thus, the system estimates when in the audio signal the word is likely to appear, based on the arrival of the word in the closed caption stream, to determine when, and for how long, to mute the audio. While the system is effective in filtering offensive words from the closed caption stream, filtering of the audio signal is based on an estimate and may result in audio that is not objectionable being blocked or audio that is objectionable getting through. Further, the system does not address objectionable content that may be present in the video signal. See also U.S. Pat. No. 6,166,780 to Bray.

Thus, notwithstanding the various systems and methods of the prior art, there is a need for a system, method, and computer program product that provides for the selective filtering of objectionable content from a program. Further, there is a need for a system, method, and computer program product that provides such selective filtering of objectionable content: (1) that can allow the user or viewer to watch a program, while filtering out objectionable material (audio or video); (2) that can mark specific portions of the audio and/or video content of a program as objectionable for selective and precise blocking of the audio and/or video signal; (3) that can identify and filter specific portions of the audio and/or video content of a program as objectionable for selective and precise blocking of the audio and/or video signal; (4) that can ensure that only the objectionable content is blocked from viewing and/or listening, and that all non-objectionable content is not blocked and all objectionable content is blocked; (5) that can block both audio and video content that is objectionable by covering over portions of the video signal and by muting portions of the audio signal; (6) that can mark, identify, and filter objectionable content based on different types and levels of intensity of objectionable material; and (7) that can be implemented in a variety of audio-video devices without requiring any specialized hardware or additional components.

SUMMARY OF THE INVENTION

The primary object of the present invention is to overcome the deficiencies of the prior art described above by providing a system, method, and computer program product that can selectively and accurately filter objectionable content from a program.

Another key object of the present invention is to provide a system, method, and computer program product than can allow the user or viewer to watch a program, while filtering out objectionable material (audio or video).

Still another key object of the present invention is to provide a system, method, and computer program product that can mark specific portions of the audio and/or video content of a program as objectionable for selective and precise blocking of the audio and/or video signal.

Yet another key object of the present invention is to provide a system, method, and computer program product that can identify and filter specific portions of the audio and/or video content of a program as objectionable for selective and precise blocking of the audio and/or video signal.

Another key object of the present invention is to provide a system, method, and computer program product that can ensure that only the objectionable content is blocked from viewing and/or listening, and that substantially all non-objectionable content is not blocked and all objectionable content is blocked.

Still another key object of the present invention is to provide a system, method, and computer program product that can block both audio and video content that is objectionable by covering over portions of the video signal and by muting portions of the audio signal.

Yet another key object of the present invention is to provide a system, method, and computer program product that can mark, identify, and filter objectionable content based on different types and levels of intensity of objectionable material.

Another key object of the present invention is to provide a system, method, and computer program product that can be implemented in a variety of audio-video devices without requiring any specialized hardware or additional components.

The present invention achieves these objects and others by providing a system, method, and computer program product for the selective filtering of objectionable content from a program. The selective filtering of objectionable content from a program is accomplished by applying an encoding process and a decoding process to the audio and/or video signal of the program. The encoding process includes marking potentially objectionable material in the program with filtering information that identifies the type (e.g., audio, violent content, sexual content, etc.) and intensity level (e.g., mild, graphic, extreme, etc.) of the potentially objectionable material using filter codes. The decoding process includes comparing, during the presentation of the program to the user and prior to outputting the audio or displaying the video, the filtering information to filter criteria, which includes user supplied filter settings, to determine whether filtering of the potentially objectionable content (i.e., audio and/or video) should be performed. If filtering is to be performed, the objectionable content in the program is filtered according to the filtering information which, in the preferred embodiment, identifies the start and duration of the filtering and, for filtering of the video of the program, also identifies the display area of the video to be blocked.

In a preferred embodiment of the present invention, the program is encoded with filtering information in the form of filter codes that mark content that is potentially objectionable. In the case of an audio and/or video signal that is a television broadcast signal, for example, the filter codes are encoded into the vertical blanking interval ("VBI") of the video signal. The encoding process of the present invention is performed using an encoding system that includes a computer system and an encoding device. The encoded program is decoded using a filtering device, which receives and decodes the program. The filtering device includes an extraction device that extracts the filter codes from the audio and/or video signal. The extracted filter codes are supplied to a processor that, based on the filter codes and the user supplied filtering criteria, determines whether the audio and/or video should be filtered. If filtering of the audio is to be performed, the processor causes an audio filter device to mute the portion of the audio containing the objectionable content. The closed caption corresponding to the portion of the audio containing the objectionable content is also filtered. If filtering of the video is to be performed, the processor causes a video filter to cover over a specified area of the video display at a specified frame for a specified duration to thereby filter the objectionable portion of the video of the program.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
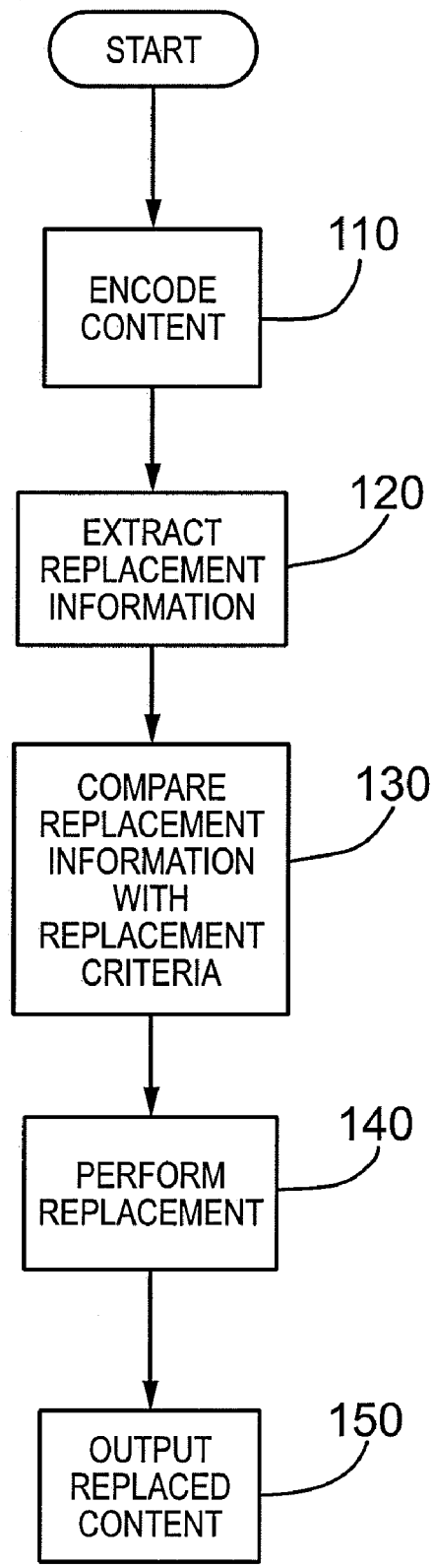
FIG. 1 is a flow diagram representing the method steps for selectively filtering objectionable content from a program in accordance with the system, method, and computer program product of the present invention.

In the following description, for purposes of explanation and not limitation, specific details are set forth, such as particular audio-video devices, audio and/or video signals, programs, processors, software, devices, components, circuits, techniques, data protocols, captioning formats, software products and systems, interfaces, hardware, etc. in order to provide a thorough understanding of the present invention. However, it will be apparent to one skilled in the art that the present invention may be practiced in other embodiments that depart from these specific details. Detailed descriptions of well-known audio-video devices, audio and/or video signals, programs, processors, software, devices, components, circuits, techniques, data protocols, captioning formats, software products and systems, interfaces, hardware, etc. are omitted so as not to obscure the description of the present invention.

As used herein, the term "audio-video device" is intended to refer to any device adapted to receive an audio and/or video signal, including but not limited to, a set-top box (STB), television set, video cassette recorder (VCR), digital video recorder (DVR), radio receiver, personal computer, digital television (DTV) receiver, or like devices and components.

As used herein, the term "audio and/or video signal" is intended to refer to a composite audio-video signal, a coded portion of a composite audio-video signal (e.g., closed caption component), a separate audio signal, or a separate video signal. Such signals may be analog signals, digital signals, streaming audio or video signals, broadcast signals, multicast or unicast signals. The audio and/or video signal referred to herein may be delivered to the audio-video device by satellite, by cable, by VHF or UHF broadcast, by radio frequency (RF) transmission, telephone line, or any other wired or wireless means for transmitting an audio and/or video signal. The incoming audio and/or video signal may also be the output from an audio and/or video playback device, such as for example, a DVD player, video cassette recorder (VCR), digital video recorder (DVR), laser disc player, compact disc (CD) player, or like devices and components.

As used herein, the term "program" and "programming" is intended to refer to an audio, audio-video, or video presentation such as, for example, a movie, a television program (e.g., a television show, movie, documentary, sporting event, news broadcast, etc.), radio broadcast, or any other broadcast (live or recorded) or recorded production.

Filtering, when used in the context of filtering of the video, means blocking a portion of the video by, for example, covering over, overwriting, blanking, changing, or obscuring the video displayed on the display screen or any other process that prevents the objectionable content of the video from being displayed on the display screen. These terms are used interchangeably throughout this disclosure.

Filtering, when used in the context of filtering of the audio, means blocking a portion of the audio by, for example, muting, "bleeping," overwriting, blanking, changing, or obscuring the audio or any other process that renders the objectionable content of the audio unintelligible to the listener.

Additional terminology, conventional technologies associated with audio-video devices, audio and/or video signals, programming, and closed captioning, as well as various standards, conventions, and equipment are set forth in "Inside Captioning" by Gary D. Robson, CyberDawg Publishing (1997), the contents of which are hereby incorporated herein by reference.

1. METHOD OF THE PRESENT INVENTION

The system, method, and computer program product of the present invention provides for the selective filtering of objectionable content from a program. Programming, and the audio and/or video signals representing such programming, that the system, method, and computer program product of the present invention may be employed to filter includes NTSC, PAL, PAL-M, MPEG, and SECAM video, various digital encoding methods for these video formats, streaming audio/video, and any other analog or digitally represented programming.

With reference to FIG. 1, a flow diagram representing the method steps for selectively filtering objectionable content from a program in accordance with the system, method, and computer program product of the present invention is shown. The method of the present invention comprises the step 110 of encoding the program to mark potentially objectionable content present in the program. The encoding step 110 may include embedding or inserting filtering information into the program sufficient to identify the potentially objectionable content (video and/or audio) or may include storing or transmitting filtering information, separately from the program, sufficient to identify the potentially objectionable content in the program. As discussed in greater detail below, step 110 is preferably performed off-line, which involves performing the encoding after production of the program, but prior to its broadcast, playback, etc. Alternatively, the encoding step 110 may be performed in realtime or on-line as the program is being broadcast, played back, etc. The encoding step 110 may be performed by a broadcaster, captioner, subtitler, production house, post production house, or other entity.

At step 120, the encoded program, which is received by the audio-video device, is decoded. The encoded program is received by the audio-video device in the form of an audio and/or video signal representing the encoded program. The decoding process extracts the encoded filtering information from the audio and/or video signal. As described above, the filtering information may be in the VBI or, alternatively, may be stored in a database or file transmitted separately to the audio-video device, or embedded in another part of the incoming audio and/or video signal for digital signals. The encoded program is, preferably, received by the filtering device, which decodes the encoded program. The encoded program, however, may be provided to the filtering device through any suitable means such as being supplied on a recorded medium, such as a video cassette, DVD, or CD for playback by a suitable player for decoding.

The extracted filtering information, which includes information identifying potentially objectionable material in the program, is then compared with the filtering criteria at step 130. The filtering criteria include information that may be provided by the user, supplied by the manufacturer of the filtering device, and/or periodically supplied by a remote source (e.g., a cable company) and indicate the type and level of potentially objectionable material that is to be filtered from the video as well as the particular words and phrases that are to be filtered from the audio.

If the filtering information does not match any of the filtering criteria then no filtering is performed. If the filtering information matches any of the filtering criteria, then the program material is filtered according to the filtering information at step 140. Thus, the filtering information also includes information sufficient to permit the filtering device to filter the objectionable content, such as information sufficient to locate the content (temporally and/or spatially).

Finally, the filtered program is then produced as an output for the immediate presentation to the viewer or for recording or transmission at step 150.

A. Filtering Information of the Present Invention

In one embodiment of the present invention, the filtering information includes one or more of three filter codes, which indicate the type of potentially objectionable material that is present, as well as information sufficient to selectively and accurately perform filtering of the material.

1. A-Codes (Audio)

Filter code "A" (A-code or audio code) represents "Audio," and marks (i.e., identifies the placement in the program) a potentially objectionable word or phrase present in the audio portion of the program. As described in more detail below, each A-code consists of a preamble containing the word being identified as potentially objectionable, which permits users to program their filtering device to filter (or not filter) on a word-by-word basis. The A-code also includes a duration, and a start symbol.

2. V-Codes (Violent Content)

Filter code "V" (V-code or violence code) represents "Violence" and marks potentially objectionable violent material present in the video portion of the program. Each V-code contains information relating to the level of intensity of the violence referred to in this example embodiment as an intensity level. The intensity levels in this example embodiment are:

1—Mild or fantasy violence
2—Graphic violence
3—Extreme violence or rape

In addition, each V-code includes information relating to a set of display coordinates to be filtered, a start code, and duration information.

3. S-Codes (Sexual Content)

Filter code "S" (S-code or sex code) marks potentially objectionable sexual content in the video portion of the program. S-codes and V-codes function nearly identically and are differentiated primarily to allow end users to filter S-codes independently of V-codes, and vice versa. S-codes have intensity levels as follows:

1—Mild nudity (topless, see-through)
2—Full nudity or highly suggestive sexual behavior
3—Graphic sex or strong sexual content The content that is considered "potentially objectionable" is defined by the designer and will vary according to the implementation of the present invention. Alternate embodiments may use additional and or different codes to permit other types of filtering. For example, a N-code could be used to identify and filter nudity, but would not identify or filter other sexually explicit content (e.g., kissing). Likewise, an R-code might be used to identify and filter potentially objectionable religious content. Other embodiments might use altogether different filter codes, filtering information and/or syntax.

4. Filter Code Syntax

All of the filter codes share a common syntax, although some of the attributes are not present in all code types. The following filter code syntax is used in the encoding and decoding process of the preferred embodiment. The general format is presented below with lowercase words and letters being included as shown, and UPPERCASE words representing the attributes to be inserted by the encoding system. The format for the codes is as follows:

<filter: TYPE>[w: WORD][c: CHANNEL][i: INTENSITY][d: DURATION][a: AREA] [CHECKSUM][s]

As shown above, the start of the filter code is enclosed in angle brackets, and uses the keyword "filter" to distinguish it from a URL (as described in EIA-608-B §7.10 through 7.14, which will typically begin with "http:"). The "TYPE" portion of the code (following the word "filter:") will be the letter a, s, or v in this example embodiment. If the two characters after "<filter:" are anything other than "a>", "s>", or "v>", then the filter code is discarded.

Following the end bracket ">" is a list of attributes associated with the filter type. All of the attributes shown above except channel and word are required for S-codes and V-codes. All except intensity and area are required for A-codes.

a. WORD Attribute

The WORD attribute is used for A-codes only and identifies the actual word being marked for potential filtering, rendered in all uppercase. If the word being inserted in the WORD attribute contains accent marks, they are stripped out in the capitalization process prior to insertion, which renders the use of extended characters unnecessary.

Since many televisions and decoders (i.e., set top cable boxes) allow viewers to see Text2 data, it is preferable to prevent the word being filtered from appearing in plain text. Therefore, in the preferred embodiment the word or phrase is encoded prior to being inserting as an attribute.

In this embodiment the word is encoded using a simple ROT-13 code as is well-known in the art. In ROT-13 encoding, each alphabetic character is replaced by the character that follows 13 positions later—wrapping around if necessary. "A" becomes "N", "B" becomes "0", and so forth. Non-alphabetic characters are not modified. The word being encoded may not include a right square bracket character ("]"), but may contain other non-alphabetic characters such as numbers, apostrophes, and other punctuation marks.

ROT-13 encoding is used because it is self-reversing (applying ROT-13 again brings back the original plaintext), easy to encode, fast executing, and adequately obscures the text. However, any suitable encoding method would suffice.

The following Visual Basic routine provides an example of a ROT-13 encoding software routine:

```
Private Function Rot13(InText As String) As String
    Dim i As Integer
    Dim OutText As String
    Dim ThisChar As Integer
        InText = UCase(InText)           ' Change to all uppercase
    OutText = ""
    For i = I To Len(InText)             ' Loop through input text
        ThisChar = Asc(Mid(InText, i 1))
        If (ThisChar >= Asc("A")) And (ThisChar <= Asc("Z")) Then
        ' It's an alphabetic character - rotate it
            If ThisChar < Asc("N") Then
                OutText = OutText & Chr(ThisChar + 13)
            Else
                OutText = OutText & Chr(ThisChar - 13)
            End If
        Else
            ' It's non-alphabetic - include as-is
            OutText = OutText & Chr(ThisChar)
        End If
    Next i
        Rot13 OutText
    End Function
``` b. CHANNEL Attribute

The CHANNEL attribute is used only for A-codes. NTSC television as used in North America allows for a primary audio program and a second audio program (SAP), which can be another language or a descriptive audio channel for blind viewers. To indicate that the word is present in the primary audio, the channel attribute is represented as a "P" (for example [c:P]) or the attribute is omitted entirely with the default being the primary audio. Conversely, to indicate that the word is present in the secondary audio program the attribute is set to "S" ([c:S]).

c. INTENSITY Attribute

The INTENSITY attribute is used with V-codes and S-codes only in this embodiment, although it could potentially be used in other code types. It represents the level of intensity of the violent or sexual content in the program, as described above. The attribute value is specified as a single digit (e.g., [i:2] representing level 2 violent content or sexual content).

The valid range of intensities is 1-3. Level 0 is not used and the filtering device interprets it equivalent to omitting the filter code entirely.

If the filtering device receives a filter code with an intensity attribute greater than 3, it treats the filter code as a level 3 intensity. If the filtering device receives an INTENSITY attribute that is not a valid positive integer, it ignores the filter code entirely and performs no filtering. For example:

[1:0] Ignored;
[1:329] Treated as level 3;
[i:−1] Ignored;
[i:two] Ignored.

d. DURATION Attribute

The DURATION attribute, which is required for all codes, specifies the number of frames (or alternately, thirtieths of a second) the program is to be filtered from the reception of the START attribute (discussed below). In the case of A-codes, it specifies how long the audio will be filtered (e.g., muted). For V-codes and S-codes, the DURATION attribute specifies how long a portion of the screen will be blanked.

The valid range of the DURATION attribute is 1 to 300 frames (1/30 second to ten seconds in NTSC video). If filtering for more than ten seconds is required, a second filter code must be used. This puts a maximum limit on the amount of programming that will be removed by an erroneous or poorly-coded filter code.

If a filtering device receives a filter code with a DURATION attribute greater than three hundred frames, it treats the filter code as having a three hundred frame DURATION. If it receives a DURATION attribute that is not a valid positive integer, it ignores the filter code entirely and does not perform any filtering.

In this embodiment, the DURATION attribute identifies the number of frames from the frame in which the start signal is found. However, in alternate embodiments the DURATION attribute could identify an absolute stop time, a relative stop time, a duration time, or a stop location within the signal or recording.

e. AREA Attribute

The AREA attribute is used in V-codes and S-codes only and specifies the television display coordinates of the area to be blocked. The format used is [a:x1,y1x2,y2]. The upper left corner of the screen is coordinate 0,0 and the lower right is 99,99. The AREA attribute is always expressed so that x1 is less than x2 and y1 is less than y2. As an example, to block coordinates (10,20) to (40,60), the attribute would read [a:10, 20-40,60].

The coordinates are relative to the full video picture in this example embodiment and not just the viewable area or safe title area. Because of the way televisions are designed and manufactured, the edges of the picture are not visible on all televisions. Consequently, all calculations of the AREA attribute are measured from the actual edges of the transmitted video.

Different implementations of filtering devices of the present invention may use different methods for generating the blocking area. Some implementations may use the caption decoding chip to generate a background while others may use an on-screen display (OSD) chip. Still others may use custom circuitry.

This means that filtering devices may be constrained to different coordinate systems depending on how the blocking rectangle is generated. For example, caption decoder chips often may not be capable of on-screen graphics (for blocking) close to the edge of the screen.

This also means that the video safe area and safe title area will vary between filtering devices. An OSD chip, for example, may be able to generate on-screen graphics considerably closer to the edge of the picture than a decoder chip.

If the filtering device receives an AREA attribute that goes outside of the area that it can block, then it is possible that objectionable material may be visible around the outside edge of the picture. If the filtering device has the ability to generate a complete blue screen, it does so instead of generating an obscuring rectangle whenever this situation arises. In other words, if the AREA attribute includes screen area outside the portion of the screen that the filtering device can block, the filtering device blocks the video signal in its entirety. This ensures that everything that is supposed to be filtered is blocked.

A blue screen is preferable to generating a totally black screen, especially when blocking the entire screen. If the screen goes black, viewers may think they have lost their signal or that the equipment is malfunctioning. If the screen turns blue (or some other color), the viewer knows the equipment is still working properly. In addition, it is preferable to display a message such as "Video Temporarily Blocked" when the screen or a portion thereof is blocked.

The filtering device generates the smallest blocking rectangle that completely covers the area to be filtered. This means that when converting from the filter code coordinate system to the filtering device coordinate system, x1 and y1 should always be rounded down, and x2 and y2 should always be rounded up. A colored rectangle (optionally containing a textual message explaining the filtering) obscuring the filtered area is preferred to blurring or pixelating as the colored rectangle guarantees total obfuscation of the specified area. However, alternate embodiments of the present invention may use other methods of obfuscating the filtered area (which may include filtering the entire screen).

If any of the four numbers of the AREA attribute (x1, y1, x2, or y2) are outside of the range 0-99, or if x1 is greater than or equal to x2, or if y1 is greater than or equal to y2, or if the attribute is syntactically invalid, then the partially-completed filter code is ignored, and all incoming characters are ignored until the next bracket character ("<") is received.

f. START Attribute

All filtering codes require the START attribute. Note that the START attribute follows the checksum at the end of the filtering code. This allows precise frame accurate placement of the START attribute after the filtering device has had time to process the entire filter code.

Filtering will begin in the frame containing the closing bracket of the START attribute and will continue for the number of frames specified by the DURATION attribute. However, in alternate embodiments the START attribute could identify an absolute start time, a relative start time, or a start location within the signal or recording.

When encoding Line 21 data, CC1 and CC2 are given precedence over Text1 and Text2. Thus, it is important that the encoding system place the start attribute at the appropriate time, even if the rest of the filter code has to be shifted several seconds earlier. The filtering device of the preferred embodiment will tolerate a delay of up to ten seconds between the checksum and the START attribute, which allows the broadcasting system maximum flexibility in fitting the data from CC1, CC2, and Text1 around the code in Text2. If more than ten seconds elapses between the closing bracket (">") on a filter code and the start attribute, then the currently received filter code and further START attributes are ignored until another filter code is received.

When there is no partially-completed filter code pending, all characters in Text2 are ignored by the filtering device until a left angle bracket ("<") is detected. If the seven characters immediately following the left angle bracket are anything other than "filter:", then the data is discarded (ignored by the filtering device) and the filtering device returns to ignoring anything other than "<" characters. If a filter code is missing a required attribute (such as the duration), the code is ignored.

g. Checksums

The checksum is computed using all data in the code from the opening angle bracket character ("<") to the closing square bracket character ("]") of the last attribute not including the checksum itself or the start code. The calculation is performed according to the algorithm defined in Internet RFC 1071, which makes it compatible with URL transmissions as defined in EIA-608-B.

The checksum is computed by combining adjacent characters in the code into 16-bit integers and taking a ones-complement sum. If there is an odd number of characters, the final character is paired with a zero. The ones-complement of this sum is expressed as a four-digit hexadecimal number in square brackets.

The following Visual Basic routine provides an example of a software routine for calculating the checksum:

```
Private Function CalculateChecksUm(code as String) as String
    Dim i As Integer
    Dim CS As Long
    i =1
    CS = 0
    ' Build the checksum using long-integer arithmetic
    Do While i <= Len(code)
        If i + 1 <= Len(code) Then
            CS = CS + Asc(Mid(code, i + 1, 1))
        End If
        CS = CS + (256 * Asc(Mid(code, i, 1)))
        i = i+2
    Loop
    ' Convert to ones-complement
    CS = (CS Mod 65536) + ((CS And &HFFFF0000) / 65536)
    ' Invert
    CS = 65535 – CS
    ' Return checksum as string
    CalculateChecksum = "[" & Hex(CS) & "]"
End Function
```

If the computed checksum for a code does not match the received checksum, then the next start attribute is ignored, and the partially-completed code (or completed code) is discarded. This prevents aberrant behavior when poor television reception causes transmission errors in the filter codes.

h. Example Filter Codes

The following are examples and interpretations of transmitted filter codes and their attributes.

Example 1

<filter:v>[i:2][d:30][a:50,0-99,99][5658][s]
The individual portions of this code would be interpreted as follows:
   <filter:v>—This is a V-code (violence);
   [i:2]—The intensity is 2 (graphic violence);
   [d:30]—The duration is 30 frames (one full second);
   [a:50,0-99,99j—The area of the screen to block is the full right half of the screen, from coordinates (50,0) at the top center to (99,99) at the bottom right;
   [5658]—This is the checksum;
   [s]—Start.

Example 2

<filter:a>[w:QNZA][c:P][d:10][0755][s]
The individual portions of this code would be interpreted as follows:
   <filter:a>—This is an A-code (audio);
   [w:QNZA]—The word being marked is "damn". Shifting to all uppercase and applying ROT-13 coding encodes it into QNZA;
   [c:P]—The audio being filtered is the primary program audio;
   [d:10]—The duration is 10 frames (⅓ second);
   [0755][s]—Checksum and start.

Example 3

<filter:s>[i:1][d:75][a:25,25-75,75][86F5][s]
The individual portions of this code would be interpreted as follows:
   <filter:s>—This is an S-code (sexual content);
   [i:1]—The intensity is 1 (mild nudity);
   [d:75]—The duration is 75 frames (2½ seconds);
   [a:25,25-75,75]—The area being obscured is half the screen width and half the screen height, right in the center of the screen;
   [86F5][s]—Checksum and start.

Example 4

<filter:a>[w:ZVREQN][c:S][d:1][ACFA][s]

The individual portions of this code would be interpreted as follows:

<filter:a>—This is an A-code indicating the audio is to be filtered;

[w:ZVREQN]—The word being marked is mierda (a Spanish obscenity).

[c:S]—The audio channel to potentially be filtered is the SAP (second audio program) channel;

[d:15]—The duration is 15 frames (½ second);

[ACFA][s]—Checksum and start.

In the present embodiment, characters used for filter codes in Text2 are generated and interpreted as ISO-8859-1 characters (also known as Latin-1 and compatible with US-ASCII), rather than as EIA/CEA-608-B characters. This maintains compatibility with URLs transmitted in Text2. Only characters between 20h and 7Eh are used. Two-byte EIA-608-B character codes and control codes are not permitted.

B. Encoding Process

As discussed above, the present invention includes the step of encoding the program to mark potentially objectionable material in the program. The encoding process generates filtering information and marks potentially objectionable content of the program, which is subsequently used to identify and filter objectionable content from the program. The encoding may be performed off-line or on-line by the broadcaster, captioner, production house, post production house, or any entity with access to data representing the program, such as access to an audio and/or video signal, transmission signal, or recording of the program. The encoding may include embedding or inserting filtering information into the program sufficient to identify the potentially objectionable material (video and/or audio) or may include storing filtering information in a database or transmitting filtering information in a file separately from the program, sufficient to identify the potentially objectionable material in the program.

The encoding process is accomplished through the use of an encoding system, which includes a computer system appropriately programmed to implement the encoding process of the present invention, as described in greater detail below.

As is well-known in the art, a conventional NTSC television signal as used in North America includes five hundred and twenty-five (525) lines of information. However, not all of these lines of information are presented visually to the viewer. Specifically, line twenty-one includes the closed caption signal if it is supplied by the broadcaster.

In one embodiment of the present invention, the filtering information is encoded in the Text 2 area of Line 21 of the VBI of a conventional television signal. In North America, the VBI comprises the first 21 lines of the video signal. Transmission of data in line 21 of the video signal is defined by Electronic Industries Association specification No. EIA-608, which is incorporated herein by reference. More specifically, specification EIA-608 specifies protocols for embedding digitally encoded information packets containing information about a television program. EIA-608 thus defines protocols for transmitting information that is useful for practicing the present invention.

In a digitally represented program, the data may be included in data packets having a particular header or other identifying characteristic. Alternately, the filtering information may be included as a separate data stream or data file and that, among other information, contains information identifying the frames or packets of data that contain potentially objectionable material in the program.

Figure 2:
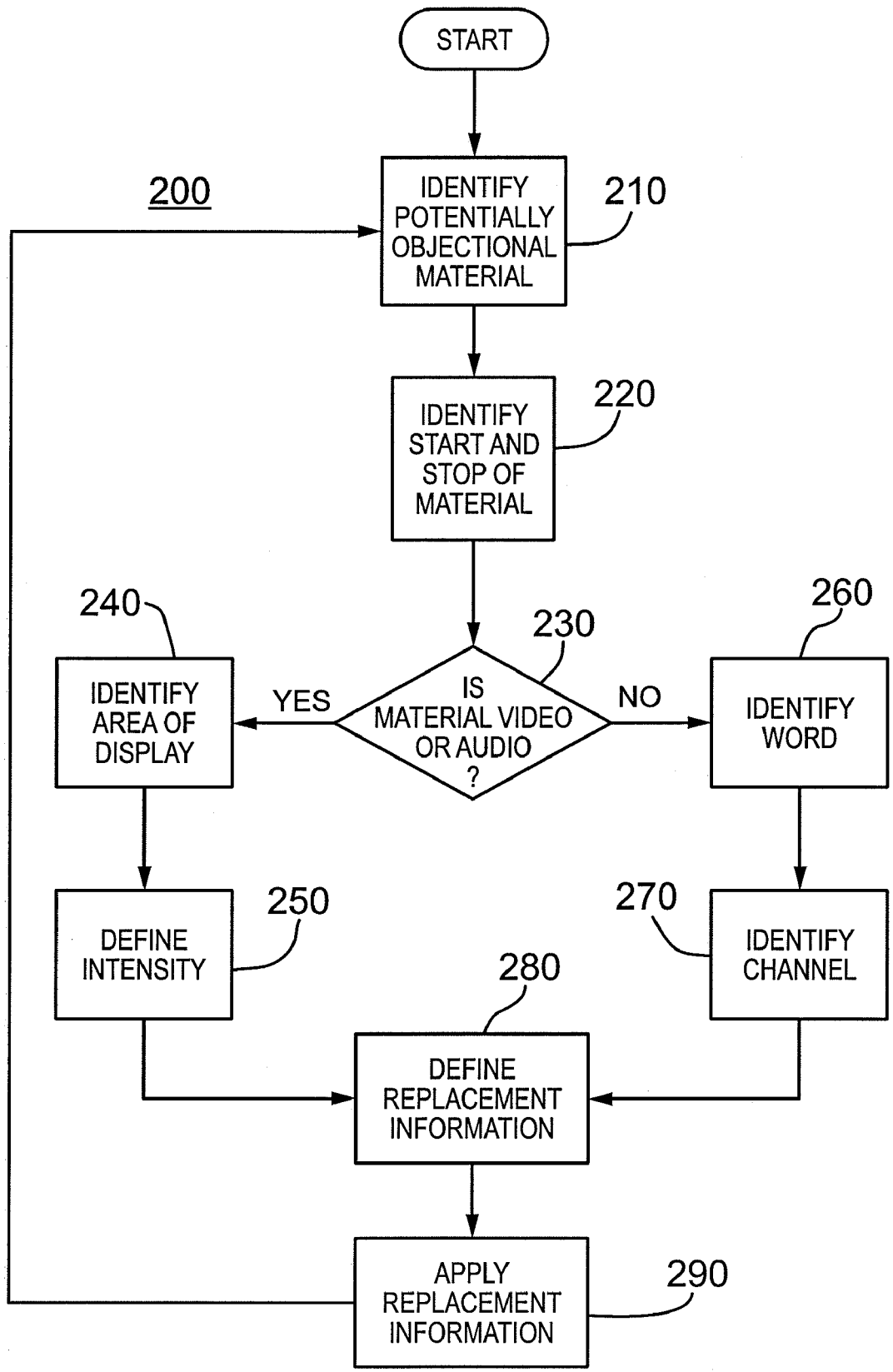
FIG. 2 is a flow diagram representing the method steps of the encoding process in accordance with the system, method, and computer program product of the present invention for selectively filtering objectionable content from a program.

Referring now to FIG. 2, a flow diagram representing the method steps of the encoding process in accordance with the system, method, and computer program product of the present invention for selectively filtering objectionable content from a program is shown. The encoding process 200 encodes the filtering information that identifies potentially objectionable video content according to the method steps shown in FIG. 2. At step 210, an operator (e.g., a person) watches and listens to the program to identify potentially objectionable material in the program. As discussed, in one embodiment of the present invention, sexual content and violent content are considered potentially objectionable video material, and particular words and phrases, such as, for example, foul language like curse words, are also considered potentially objectionable audio material.

Once the potentially objectionable content is identified at step 210, the tart and stop of the potentially objectionable material is identified at step 220. This information might be the start frame and stop frame of the material, the start frame and duration of the material, start time and stop time (as measured from the beginning of the program), or any information suitable to facilitate reasonably precise filtering of the program. In the preferred embodiment of the present invention, the encoder identifies the frames in which the potentially objectionable material is present, which is stored in the memory of the encoding system and used to determine the DURATION and START attributes of the filter code, as described above.

At step 230, the system determines whether the potentially objectionable content identified is video content. If it is, then at step 240, the area of the video display where the potentially objectionable video content is present and potentially to be filtered is identified. The area of the display containing the potentially objectionable material is identified by the encoder by using the pointing device (e.g., the mouse) of the encoding system to draw a rectangle (or other arbitrary shape) around the outer boundary of the potentially objectionable content. The coordinates of the shape are then stored in the encoding system memory to generate the AREA attribute of the filter code.

If the potentially objectionable content identified is video content, the intensity level of the potentially objectionable video material is defined at step 250. As discussed above, in the example embodiment, the intensity level may be 1, 2, or 3 and is dependent on the type of potentially objectionable video material (e.g., sexual content or violent content) and the intensity of the identified portion of the program. Thus, after comparing the potentially objectionable material with the appropriate intensity level standard, the encoder inputs the appropriate intensity level into the encoding system, which is stored in memory and used to generate the filter code.

If the potentially objectionable content identified is audio content, the potentially objectionable audio material is identified at step 260. In the preferred embodiment, this is accomplished by supplying the word or phrase to the encoding computer system, which encodes the word according to ROT-13 encoding, as described above, and stores the encoded word in memory for use in the filter code.

If the potentially objectionable content identified is audio content, the audio channel of the potentially objectionable audio is identified at step 270 and stored in the encoding system memory for inclusion into the filter code.

At step 280, the type of potentially objectionable content is defined. As discussed, in the preferred embodiment the potentially objectionable content is identified as either sexual video content (S-code), violent video content (V-code), or audio content (A-code). The encoder supplies the type of potentially objectionable material to the encoding system, where it is stored for use in the filter code.

Finally, at step 290, the filtering information is applied to the program by marking the program with the filtering information. As discussed above, this may include embedding the information in the program or storing the filtering information to be supplied with the program in a separate signal, transmission, or data file. In the preferred embodiment of the present invention, the filter codes are encoded in the Text 2 area of Line 21 of the VBI.

While the operator of the example embodiment described above is a person watching and listening to the program and supplying filtering information, in an alternate embodiment, the operator may be a closed caption decoder and an appropriately programmed computer system that compares the closed caption of the program with a database of potentially objectionable words and phrases and provides inputs to the encoding system as is appropriate. In still another embodiment, well-known voice recognition software that converts the audio to text could be used with an appropriately programmed computer system that compares the converted audio of the program with a database of potentially objectionable words and phrases.

B. Decoding Process

Figure 3:
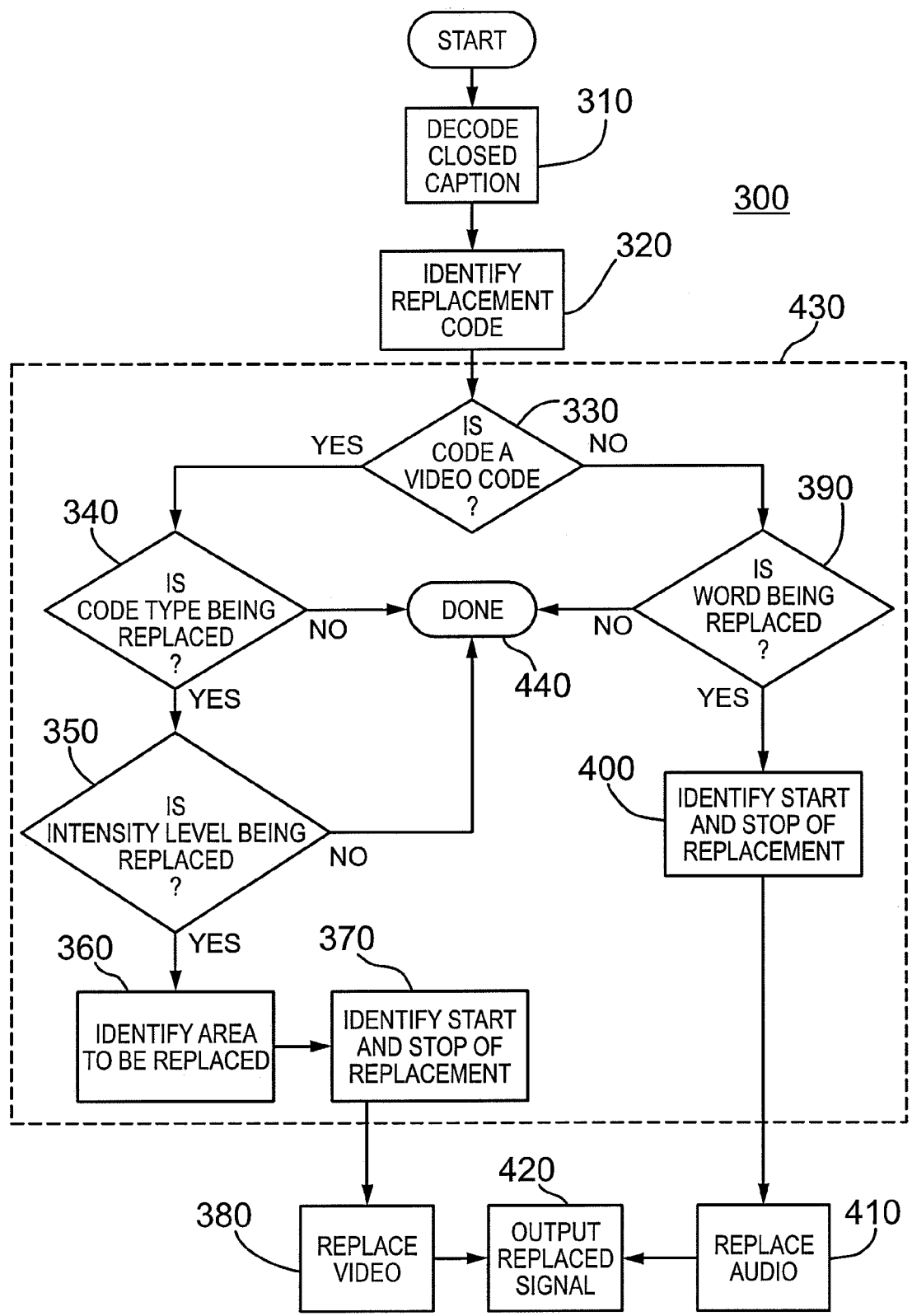
FIG. 3 is a flow diagram representing the decoding process in accordance with the system, method, and computer program product of the present invention for selectively filtering objectionable content from a program.

Upon being supplied the encoded program in the form of an audio and/or video signal representing the encoded program—either by reception of a transmission or by playback from a recorded medium—the filtering device performs the decoding process. With reference to FIG. 3, a flow diagram representing the decoding process in accordance with the system, method, and computer program product of the present invention for selectively filtering objectionable content from a program is shown. As will be discussed in more detail below, the filtering device includes a processor executing software designed to operate the filtering device to implement the decoding steps. Appropriate software can be readily prepared by programmers of ordinary skill based on the teachings of the present disclosure, as will be apparent to those skilled in the software arts.

In one embodiment of the present invention, at step 310 of the decoding process 300, the closed caption of the video signal is decoded. At step 320, the filter codes are extracted, which identify potentially objectionable content. As discussed in more detail above, if the process receives a partial filter code, a filter code with invalid syntax, a filter code with an incorrect checksum, or a filter code with some other defect, the process will discard the filter code. The combination of steps 310 and 320 of the decoding process of this example embodiment shown in FIG. 3, corresponds generally to step 120 of FIG. 1 (Extract Filtering Information).

In this embodiment, the codes may be either video or audio codes. Thus, at step 330, the process determines whether the potentially objectionable content is video. If so, the process continues to step 340, which determines if the potentially objectionable material is of a type that is being filtered. More specifically, the filter code is compared with the filtering criteria that may be supplied by the user to determine whether the user desires to filter that particular type (e.g., sexual content or violent content) of potentially objectionable material.

If the filter code does not match the filtering criteria (indicating that that type of potentially objectionable material should not be filtered), then no filtering need be performed and the process terminates at step 440 until new filtering information is identified. For example, if the user has elected to not filter any violent content and the filter code is a V-code, then the process does not filter the potentially objectionable video content marked by the V-code.

If, at step 340, it is determined that the filter code of the filtering information does match the filtering criteria, (indicating that the potentially objectionable content is of a type that should be filtered), then at step 350 the intensity level of the filter code is compared with corresponding filtering criteria to determine if the material should be filtered. Specifically, the process determines if the intensity level of the potentially objectionable content is of a level that should be filtered by comparing the intensity level of the material with the intensity level that the user supplied filtering criteria indicates should be filtered. For example, if the user supplied filtering criteria indicates that only sexual content with an intensity level of two or greater should be filtered, and the filter code is an S-code with an intensity level of one, the process does not filter the video content marked by the S-code. If it is determined at step 350 that the video should not be filtered, the process terminates at step 440 until new filtering information is identified.

If, at step 350, it is determined that the intensity level of the potentially objectionable content is of a level that should be filtered, the area of the video display to be filtered is identified from the filter code's AREA attribute at step 360, and at step 370, the start and stop points for filtering the video are determined by using the DURATION and START attributes as described above.

At step 380, the video is filtered according to the processed filtering information and, at step 420, is output for viewing, transmission, or recording.

If, at step 330, the potentially objectionable content is determined to be audio, the process continues to step 390, which determines if the word or phrase identified as potentially objectionable is a word or phrase (hereinafter collectively referred to as "word") that should be filtered. This determination is accomplished by comparing the word with the filter criteria. In this example embodiment, the audio filtering criteria includes a word list, described in more detail below, including information of numerous variations of words that the user has indicated should be filtered, by use of an exhaustive list, formulas using pattern matching and/or wildcard characters, translation systems, or other equivalent method of generating a list of words. As discussed above, the word list may be include data from the user, downloaded from a remote source, and/or originally supplied with the filtering device. If an A-code identifies a word that is not in the word list, the word marked by that A-code is not filtered from the audio, and the process terminates at step 440 until new filtering information is identified. If the word identified matches filtering criteria (indicating that it is a word or phrase that should be filtered), the start and stop points for filtering the audio are determined at step 400 by using the DURATION and START attributes as described above.

The system may also optionally filter the closed caption, which prevents display of the offensive word in the displayed closed caption. If a word identified is in the word list, each letter in the word present in the closed caption will be replaced in the closed caption with an uppercase "X." Substituting the letter X is preferred, instead of simply removing the word, because captions with missing words are more difficult to read and follow. Using non-letters (like white block) appears very similar to transmission errors in the captioning, so use of the uppercase "X" is preferable, although not required.

At step 410, the audio is filtered and at step 420 is output for recording or for immediate audible production.

Functional blocks within the dashed box 430 correspond generally to functional block 130 of FIG. 1. Likewise, the combination of functional blocks 380 and 410 of FIG. 3 correspond generally to functional block 140 of FIG. 1, and functional block 420 of FIG. 3 corresponds generally to block 150 of FIG. 1.

C. Set-Up Process

As discussed above, the process of the present invention compares filtering information with filtering criteria to determine whether potentially objectionable material is to be filtered. Some of the filtering criteria may be supplied by the user, downloaded from a remote device, or supplied with the filtering device. The set up process allows the user to supply and modify the filtering criteria stored in the filtering device. In the preferred embodiment, the user enters filter settings to establish and change the filtering criteria through a user input device, such as, for example a remote control. The filter settings entered by the user include the types of video filtering to be performed (violence and/or sexual content), if any, and the intensity level for each type of video filtering (e.g., 1, 2, or 3). In an alternate embodiment, the user may enter a zero as the intensity level to indicate that no filtering should be performed. In this alternate. embodiment, the decoding process need not perform step 340 (determine if code is of a type to be filtered), but instead could simply compare the intensity level of the code with the filtering criteria.

In addition, the user may enter filter settings to establish or change the filtering criteria for the audio, which includes information indicating whether audio filtering is to be performed and which may include specific words to be filtered. In addition, the filtering device of the present invention includes potentially objectionable words prestored during the manufacturing process and/or periodically downloaded from a remote source—all of which may be modified by the user. All the user-supplied information is stored in non-volatile memory in the filtering device.

In addition, the user can use the remote control to override the filtering function of the filtering device by establishing a password or personal identification number ("PIN"), and then entering the appropriate password or PIN to override the filtering process. This permits those who know the appropriate password or PIN to watch or listen to an individual program that the filtering device may otherwise filter portions of, without reprogramming the filtering device. At the end of the program (or after a time period), the filtering device may be programmed to automatically resume its normal filtering. Filtering device 600 can also detect when a program is over by monitoring data packets containing the title or identification number for the current program (e.g., XDS packets as described in EIA-608-6), as is well known in the art. Thus, in one embodiment of the present invention, the filtering device returns to normal filtering when a new program is present (e.g., after the program is over or when a new channel or station with a different program is tuned to).

II. System of the Present Invention

A. Hardware

1. Encoding

Figure 4:
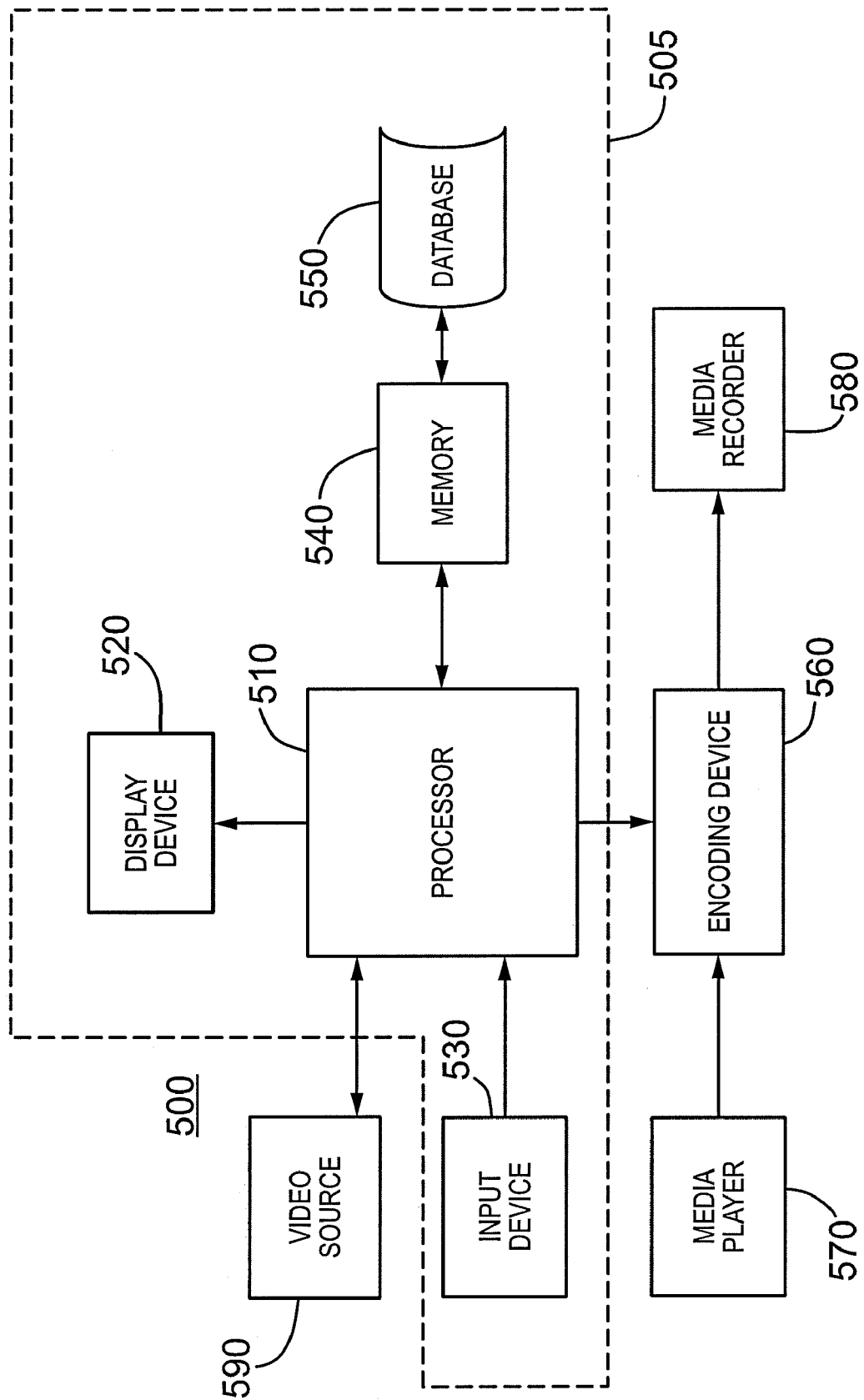
FIG. 4 is a functional block diagram of the encoding system of the system, method, and computer program product of the present invention for selectively filtering objectionable content from a program.

Referring now to FIG. 4, a functional block diagram of the encoding system of the system, method and computer program product of the present invention for selectively filtering objectionable content from a program is shown. This example embodiment of an encoding system in accordance with the present invention includes an encoding device 560 and a computer system 505 comprising a processor 510 programmed according to the teachings of the present invention, which can be readily prepared by programmers of ordinary skill based on the teachings of the present disclosure as will be apparent to those skilled in the art. In addition, the computer system 505 includes a display device 520, an input device 530 (such as a keyboard and mouse), and a memory 540, including a database 550. The database contains, among other data, a word list of all the potentially objectionable words and phrases, and is accessed by the system as part of the identification of potentially objectionable audio content.

The processor 510 is coupled to an encoding device 560, which receives the program from a media player 570, or that is transmitted from a remote location. The encoding device encodes the program according to the encoding process of the present invention, as described above, and outputs the encoded program for storage in a media recorder 580 or for transmission. In addition, the system may include a video device source 590, such as a DVD player or CD-ROM drive, that may be used to encode programs that have been stored in other formats and/or media. In most embodiments, it is expected that the video source 590 and media player 570 will be the same piece of equipment, although this is by no means necessary.

As discussed above, the encoding system of the preferred embodiment includes an encoding device 560 for encoding the filtering information into the closed caption field of the VBI or into an equivalent location in a non-NTSC signal. There are numerous commercially available encoding devices that could be used to perform this step of the preferred embodiment such as the EEG EN-470 Smart Encoder III by EEG Enterprises, Inc. of Farmingdale, N.Y.; the Closed Caption Encoder for Personal Computers (CCE/PC) by Soft Touch Inc. of Alexandria, Va.; many of the caption encoders manufactured by Ultech Co., Ltd. of Korea, and the Norpak TES3 (which can encode Line 21 captioning into NTSC, PAL, and SECAM video) by Norpak of Kanata, Ontario, Canada. In an alternate embodiment of the present invention, such as for encoding into a digital video signal, the Evertz 8070 Digital Encoder by Evertz Microsystems of Burlington, Ontario, Canada could be used.

2. Decoding

Figure 5:
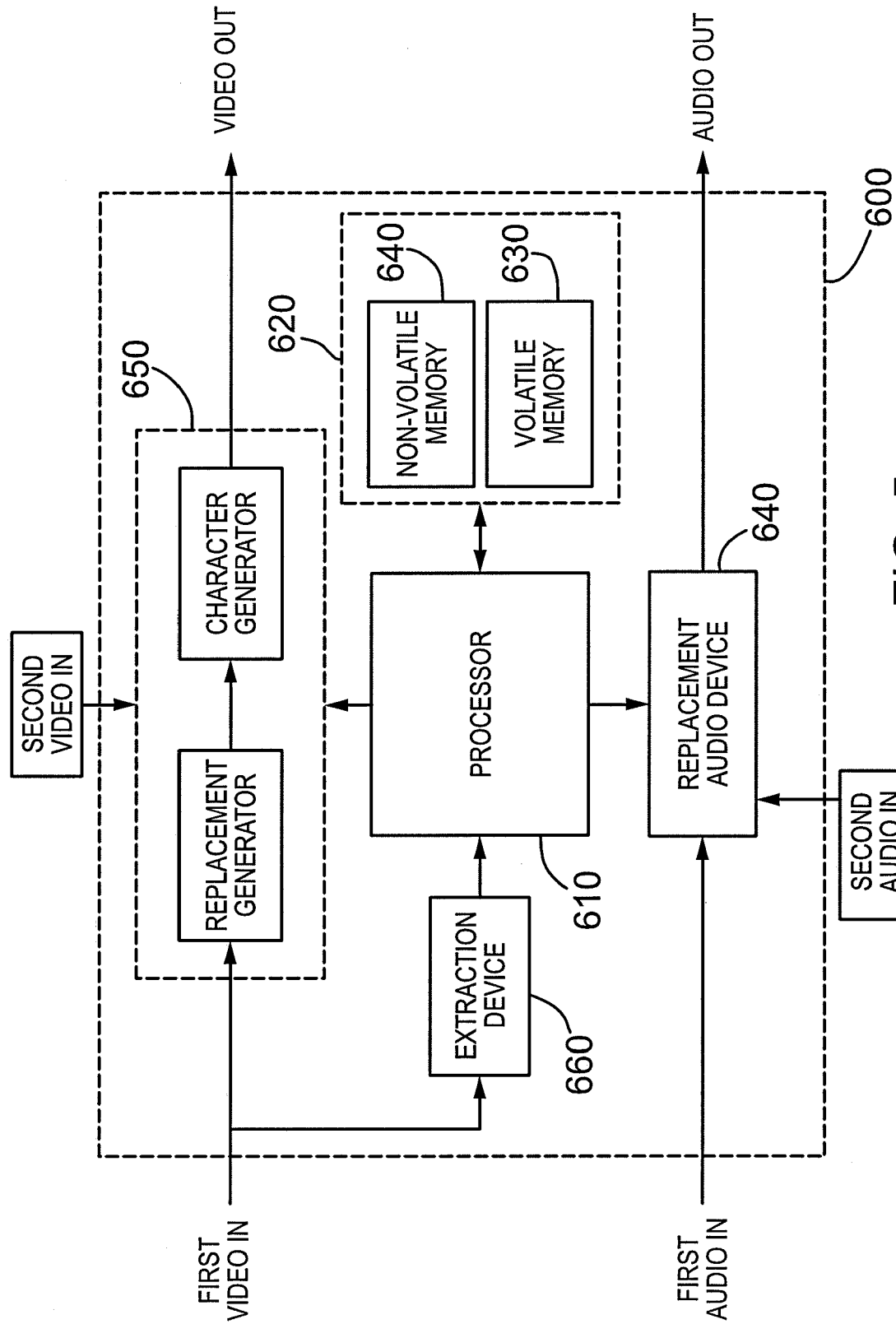
FIG. 5 is a functional block diagram of the filtering device of the system, method, and computer program product of the present invention for selectively filtering objectionable content from a program.

Turning now to FIG. 5, a functional block diagram of the filtering device of the system, method, and computer program product of the present invention for selectively filtering objectionable content from a program is shown. Filtering device 600 includes a general purpose processor 610 appropriately programmed with software implementing the decoding process of the present invention that can be readily prepared by programmers of ordinary skill based on the teachings of the present disclosure, as will be apparent to those skilled in the software art. The processor 610 may be a microprocessor, microcontroller, RISC processor, or any processing device capable of executing software instructions and acting on them accordingly.

The filtering device 600, in this example embodiment of the present invention, is in the form of a set top box and includes an extraction device 600, an audio filter 640, a video filter 650, and main memory 620. The main memory 620 includes random access memory (RAM) 630 or other dynamic storage device (e.g., dynamic RAM (DRAM), static RAM (SRAM), synchronous DRAM (SDRAM), flash RAM)), coupled to a bus for storing information and instructions to be executed by processor. In addition, main memory 620 also includes nonvolatile memory (e.g., NVRAM, EEPROM, or similar memory device that retains its contents when power is removed) 670 for storing filtering criteria, passwords/PINs, and other information. Filtering device 600 further includes a read only memory (ROM) or other static storage device (e.g., programmable ROM (PROM), erasable PROM (EPROM), and electrically erasable PROM (EE- PROM)) (not shown) coupled to a bus for storing static information such as program code and instructions for the processor 610.

The main memory 620 of the filtering device 600 may store structures, tables, records, or other data described herein. As discussed, the present invention includes software for controlling the filtering device, for driving a device or devices for implementing the decoding process of the present invention, and for enabling the filtering device to interact with a human user. Such software may include, but is not limited to, device drivers, operating systems, development tools, and application software.

In the example embodiment of the present invention, a television broadcast signal is received through a coaxial cable from the head end of the cable broadcaster. The incoming television signal could, alternatively, be delivered to the filtering device 600 by satellite, by cable, by VHF or UHF broadcast, or in any other suitable way. The incoming signal may also be the output from a video playback device, for example, a video cassette recorder ("VCR"), a laser disk player, or a DVD. Suitable transmission media includes coaxial cables, copper wire and fiber optics, telephone transmission lines, and radio wave broadcasts including digital satellite broadcasts. The transmission media may also take the form of acoustic or light waves, such as those generated during radio wave and infrared data communications.

The filtering device 600 has inputs for one or more signals, which comprises an incoming video and/or audio signal. The filtering device 600 also has outputs for a composite video and audio, which may be connected to the appropriate inputs of a television, a VCR, or other device. Separate outputs and inputs (not shown) for a composite audio-video signal and/or other signal format(s) may also be provided in addition to, or instead of, the described outputs and inputs.

Filtering device 600 also includes an extraction device 660. The video signal is supplied to the extraction device 660, which in the present example embodiment, is a decoder chip, such as a 86129 Decoder and On Screen Display chip available from Zilog Corporation. The extraction device 660 could be implemented with other similar integrated circuits, with other multi-purpose integrated circuits, with discrete components, or with some combination thereof. The extraction device 660 extracts the data from Line 21 of the VBI and supplies the data to the processor 610 for processing, thereby performing step 310 of the decoding process.

The processor 610 receives the extracted data, groups the characters to recognized filter codes, attributes, words, and delimiters whose meanings are discussed above, and performs the steps described above to determine whether to filter the program. More specifically, after identifying a valid filter code, the processor 610 compares the code and its associated filtering information (e.g., code type, and intensity level or word/phrase) with the stored filtering criteria to determine whether the potentially objectionable material should be filtered from the program, as discussed with respect to step 130 of FIG. 1 and the steps in block 430 of FIG. 3.

Filtering device 600 also includes an audio filter 640, which is operatively coupled to the processor 610. Upon determination that the audio is to be filtered, the processor 610 causes the audio filter 640 to filter the audio for a specified duration, and at the start time (or frame) as dictated by the attributes of the received A-code. The audio filter 625 could be implemented with any of the many well-known devices capable for muting or filtering the audio including discrete components (any of the numerous transistor switches), or integrated circuit switches, which operate to disconnect the output from the input. Other types of filter devices well-known in the art would also suffice.

Filtering device 600 also includes a video filter 650, which is operatively coupled to the processor 610. When the received filter code and the stored filtering criteria indicate that the video should be filtered, processor 610 causes the video filter 650 to cover over the video in the area, at the start frame, and for the duration designated by the filter code's attributes so that the objectionable video is not produced by the television display or recorded on any medium receiving the video signal. In the preferred embodiment, the video filter 650 is comprised of a character generator and a blocking rectangle generator that cooperate to filter the video signal at the designated area. As an example, the on-screen display (OSD) capabilities of a product like the aforementioned Zilog 86129 would allow it to generate a block of text with a solid black background which obscures the picture behind it. The text could be blank (spaces), producing a plain black box, or some text (e.g., "[blocked]" or "objectionable video filtered") could be placed in the box.

The video filter 650 could be implemented with any of the many well-known devices capable for blanking a portion of the video including character generators, superimposers, on-screen display chips, discrete components (e.g., transistor switches), other integrated circuit switches, or some combination thereof. Other types of video control devices well-known in the art would suffice as well. In addition, audio filter 640 and video filter 650 could be implemented with the same or common circuitry.

The output of the filtering device 600 may be supplied to a television, a monitor, or to a video cassette recorder (VCR) (or other audio/video display/recording device) and then supplied to the television.

Filtering device 600 also includes a user input device or component, which can be any means that allows a user to input information, such as filter settings for establishing or changing filtering criteria, including passwords, PINs, and other filtering information, to the filtering device. In the preferred embodiment of the present invention, the input means includes an infrared remote control transmitter (not shown), which transmits control signals to an infrared receiver (not shown) in the filtering device. When the infrared receiver receives a control signal from the infrared transmitter, it interrupts the processor 610. Processor 610 can then retrieve and interpret the transmitted information. The user input means allows the user to perform the set up process described above, as well as override filtering, and establish and change filter settings. Filtering device 600 also includes a visual display, such as an LED display, to provide visual feedback to the user relating to its operation.

The filtering device 600 performs a portion of, or may perform all of, the processing steps of the decoding process of the present invention in response to the processor 610 executing one or more sequences of one or more instructions contained in main memory 620. One or more processors in a multi-processing arrangement may also be employed to execute the sequences of instructions contained in the main memory. In alternative embodiments, hard-wired circuitry may be used in place of, or in combination with, software instructions. Thus, systems, devices, components, and methods embodying the present invention are not limited to any specific combination of hardware circuitry and software.

The filtering device 600 also includes a communication interface (not shown) coupled to the bus. The communication interface provides a two-way data communication coupling to a network link that is connected to a local network (e.g., LAN), cable network, satellite system, etc. For example, the communication interface may be a network interface card to attach to any packet switched local area network (LAN). As another example, the communication interface may be an asymmetrical digital subscriber line (ADSL) card, an integrated services digital network (ISDN) card, or a modem to provide a data communication connection to a corresponding telephone line. Wireless links may also be implemented. In any such implementation, the communication interface sends and receives electrical, electromagnetic or optical signals that carry digital data streams representing various types of information. The filtering device can transmit notifications and receive data, including program code, through the network(s), network link, and communication interface.

The filtering device may also include special purpose logic devices (e.g., application specific integrated circuits (ASICs)) or configurable logic devices (e.g., generic array of logic (GAL) or reprogrammable field programmable gate arrays (FPGAs)) as may be necessary for the intended application.

The filtering device may optionally include a tuner, which, as is well known in the art, receives a plurality of radio frequency signals. The tuner selects a particular channel (usually based on frequency), may or may not amplify it, and supplies it to the extracting device 610, video filter 650 and/or audio filter 640 of the filtering device 600 of the present invention. In an alternate embodiment, the tuner may be a digital tuner that selects a digitally broadcast signal transmitted on a radio carrier wave.

Those skilled in the art will readily understand that the functionality described herein can be achieved through the use of different components including the components used for the microprocessor and extraction device. The particular circuitry associated with the processor 610, and the circuitry for interfacing the processor to other devices, such as memory, and the other parts of the apparatus can have many variations. Those skilled in the art will readily understand how the filtering device 600 could be constructed in light of this disclosure.

B. Software

The system and method of the present invention is preferably implemented in general purpose processors running computer programs comprised of software modules implementing the process of the present invention for selectively filtering objectionable content from a program. The architecture, design, modules, and code of the software of the present invention could be implemented in a variety of ways and the manner in which it is implemented is largely a matter of design choice well within the ordinary skill level of those skilled in this art. Further, the data stored in memory and used by the computer program is dependent on the software implementation of the present invention. As would be evident to one skilled in the art, the results of the computations for implementing the present invention, such as filter code comparisons, filtering criteria, passwords, PINs, filter code attributes, and other information are stored in memory and retrieved from memory as needed.

1. Encoding Software

As discussed, the present invention uses a computer system that interfaces with n encoding device to perform the encoding process according to the present invention. There are numerous commercially available computer programs that could be used to implement the present invention provided by companies such as Computer Prompting and Captioning Co. of Rockville, Md.; Cheetah Systems, Inc. of Tucson, Ariz.; Image Logic of Chevy Chase, Md.; and Advantage Software of Stuart, Fla., as well as proprietary software used by captioning service providers such as VITAC of Cannonsburg, Pa.; National Captioning Institute of Vienna, Va.; and The Caption Center/WGBH of Boston, Mass.

As will be apparent to those skilled in the software art, appropriately programmed software could also be readily prepared by programmers of ordinary skill based on the teachings of the present disclosure.

2. Decoding Software

The filtering device 600 performs processing steps of the present invention in response to the processor 610 executing one or more sequences of one or more instructions contained in main memory 620. As will be apparent to those skilled in the software art, appropriately programmed software can be readily prepared by programmers of ordinary skill based on the teachings of the present disclosure.

In addition, a remote computer can load the instructions for implementing all or a portion of the present invention remotely into a dynamic memory and send the instructions over a telephone line using a modem or over a cable signal line to the bus in the filtering device 600. The bus carries the data to main memory, from which the processor retrieves and executes the instructions. The instructions received by main memory may optionally be stored on storage device either before or after execution by processor.

a. The Word List

As discussed above, the filtering device 600 includes filtering criteria, which is used to determine whether a marked portion of the program is filtered. One portion of the filtering criteria is the word list, which is a set of data stored in the memory of the filtering device that identifies words and phrases that the user wishes to filter (provided audio filtering is turned on). The word list can be pre-programmed by the manufacturer, downloaded from a remote site, entered by the user, or some combination thereof which may include periodic updates. This word list is stored in all uppercase with no accent marks. For example, an obscenity in another language with an accented lowercase a (such as à, á, â, or ä) is stored in the word list as an UAIJ. The enya (Ñ) is stored as a plain N, and the c-cedilla (ç) is stored as a plain C.

The words in the list may also contain wildcards. An asterisk (*) means zero or more of any character, and a question mark (?) means precisely one of any character.

For example, if "*shit" is present in the word list, the processor will filter the words shit, bullshit, horseshit, and anything else ending with shit. If "shit*" is present, the device will filter the words shit, shifty, shithead, and anything else starting with "shit." If "*shit*" is present in the word list, the device will filter any word containing "shit" anywhere in it.

The words before and after a hyphen are treated as separate words. For example, if "shit" is in the word list, then the filtering device will display and filter "shit for-brains" as "xxxx-for-brains." No wildcard is required to accomplish this.

When words are being replaced in the closed caption, the entire word is changed to X characters—not just the non-wildcard parts. In the example above, if the list contains "*shit", then "bullshitt" is changed to "XXXXXXXX", not "bullXXXX."

For blanking purposes of words in the closed caption, the apostrophe counts as the start of a new word. In other words, if "crap" is in the word list, the sentence "That crap's bad" is filtered to "That XXXX's bad."

While the example embodiment of the present invention described above uses V-codes, S-codes, and A-codes, additional codes or fewer codes be used. In addition, audio filtering may be omitted, or performed in a different manner.

For example, Automatic Obscenity Audio Filtering (AOAF) is a means for filtering the audio of programming that does not contain A-codes, which may be used instead of, or in addition to, A-codes. AQAF compares the text present in the closed caption that represents the audio with the word list to identify potentially objectionable audio. When AOAF is turned on and the filtering device recognizes a word that should filtered in the closed caption, it will estimate the time at which it should start filtering the audio signal, and filter the audio for a predetermined amount of time (usually 1.0 to 1.5 seconds) starting at the estimated start time.

One possible algorithm for estimating the time to filter the audio assumes that a pop-on caption appears just as the caption's first word is spoken. This assumption is not always correct, but generally provides a good starting point. The filtering device can either keep a running calculation of average reading rate over the prior few minutes, or simply use a typical value such as one hundred sixty (160) words per minute.

To determine when filtering should start, the system calculates how many words in the caption need to be skipped in order to reach the word to be filtered and multiplies the reading rate in frames per word by the number of words.

For example, 160 wpm equals 11.25 frames per word. If the objectionable word is the fourth word in the caption, the calculation would be 3 multiplied by 11.25 which equals 33.75 frames. Rounding this number to thirty-four (34), the processor would cause the audio filter to start filter thirty-four frames after the caption appears.

As with the preferred embodiment, this alternate embodiment may replace each letter in the objectionable word with an uppercase "X." This prevents display of the offensive word in the displayed closed caption.

While the preferred embodiment is implemented to filter NTSC programming, an alternate embodiment could be used to filter digital programming in which case the filtering information could be sent as a separate file (such as a separate database file) or with information in each digital packet (such as a portion of the header) that identifies the packet as filtering information. The filtering packets would then identify the program packets containing potentially objectionable content.

In still another embodiment, the present invention could be used with High Definition TV (HDTV) in which the filtering information could be embedded in the captions according to EIA-708.

In yet another embodiment using digital video, the filtering information could be stored in a separate file or sent in a separate stream according to the Synchronized Accessible Media Interchange (SAMI) format or the Synchronized Multimedia Integration Language (SMIL).

Information for practicing the invention could also be conveniently transmitted as XDS data using the undefined data type provided by EIA-608. This or similar information could also be encoded and transmitted in ways which do not conform with the EIA-608 specification.

The computer code of the present invention may be any interpreted or executable code mechanism, including but not limited to scripts, interpreters, dynamic link libraries, Java classes, applets, objects, ActiveX components, and complete executable programs. In the example embodiment, the software is stored in memory as an executable program. Moreover, parts of the processing of the present invention may be distributed for better performance, reliability, and/or cost.

It will be readily apparent to those skilled in the art that the invention could be practiced with other protocols and/or by encoding, embedding or supplying the data in, or along with, the video signal using other encoding, embedding, or marking techniques. It is important, however, that the potentially objectionable material in the program be locatable (either temporally, positionally, or spatially) in the audio and/or video signal.

The computer program and software modules of the system, method, and computer program product of the present invention may be implemented using any operating system, and associated hardware including, but not limited to, Unix, Linux, VMS, IBM, Microsoft Windows NT, 95, 98, 2000, ME, and XP, Palm OS, Microsoft Windows CE, Macintosh OS, OS/2, and the like.

The systems, processes, and components set forth in the present description may be implemented using one or more general purpose computers, microprocessors, or the like programmed according to the teachings of the present specification, as will be appreciated by those skilled in the relevant art(s). Appropriate software coding can readily be prepared by skilled programmers based on the teachings of the present disclosure, as will be apparent to those skilled in the relevant art(s).

The present invention thus also includes a computer-based product which may be hosted on a storage medium and include instructions that can be used to program a computer(s) or like device(s) or component(s) to perform a process in accordance with the present invention. The storage medium can include, but is not limited to, any type of disk including a floppy disk, optical disk, CDROM, magneto-optical disk, ROMs, RAMs, EPROMs, EEPROMs, flash memory, magnetic or optical cards, or any type of media suitable for storing electronic instructions, either locally or remotely.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention. For example, the present invention may also be built into a television set as opposed to a stand-alone set top unit.

While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that within the scope of the appended claims, the invention may be practiced otherwise than as specifically described herein.

What is claimed is:

1. A device for selectively filtering objectionable content from a signal, including a video component and an audio component, comprising:
   an extraction device receiving all or part of said signal and configured to extract information therefrom relating to objectionable content;
   a video control device and an audio control device;
   a processor operatively coupled to said video control device and said audio control device and communicatively coupled to said extraction device for receiving at least a portion of said extracted information therefrom; and
   a memory coupled to said processor and storing filtering criteria;

said processor configured to cause said audio control device to filter a portion of the audio component in response to identifying audio content that satisfies said filtering criteria; and said processor configured to cause said video control device to filter a portion of the video component in response to identifying video content that satisfies said filtering criteria such that only portions of displayed video frames corresponding to the identified video content are obscured.

2. The device of claim 1, wherein said extracted information is extracted from data in Line 21 of the vertical blanking interval ("VBI") or packet data, such as extended data services ("XDS"), in the VBI.

3. The device of claim 1, wherein said filtering information is extracted from streaming text transmitted in conjunction with the signal.

4. The device of claim 1, wherein said filtering information is extracted from a text file transmitted independently of the signal.

5. The device of claim 1, wherein said filtering information is extracted from textual information embedded in or transmitted in conjunction with directory or guide information in a satellite, HDTV, or other digital television environment.

6. The device of claim 1, wherein said filtering information is extracted from a metafile or sub-picture in a DVD, video CD, or other stored digital video medium utilizing MPEG or similar video and/or audio storage formats.

7. The device of claim 1, wherein said filtering information is extracted from a subcarrier, FM sideband or from text data or packet data embedded in a digital radio signal.

8. A device for filtering objectionable content from a video program intended for viewing on a display screen including video and audio components, said device comprising:

an extraction device receiving at least a portion of the video program and configured to extract information therefrom identifying potentially objectionable video and/or audio content in said video program;

a video control device;

a processor coupled to said video control device and receiving at least a portion of said extracted information; and a memory coupled to said processor and storing filtering criteria defining objectionable audio and/or video content;

said processor configured to cause said video control device to filter the video component in response to filtering information in said extracted information satisfying said filtering criteria so that only portions of displayed video frames corresponding to objectionable video content in said video program cannot be visually discerned.

9. The device of claim 8, wherein said filtering criteria is user defined.

10. The device of claim 8, wherein said filtering information includes information relating to a location in the video program the filtering should begin.

11. The device of claim 8, wherein said filtering information includes information relating to a time in the video program the filtering should begin.

12. The device of claim 8, wherein said filtering information includes information relating to the level of intensity of the objectionable content.

13. The device of claim 8, further including:

an audio control device coupled to said processor; and wherein:

said memory contains one or more words and/or word fragments stored therein corresponding to objectionable audio content;

said extraction device is configured to extract a closed caption signal from the video component;

said processor receives said extracted closed caption signal and is configured to compare words in said extracted closed caption signal with said words and/or word fragments stored in memory; and said processor causes said audio control device to filter the audio component in response to determining that a word stored in said memory is present in said extracted closed caption signal.

14. The device of claim 8, wherein said filtering information includes information relating to the duration the video component is to be filtered in response to said filtering information satisfying said filtering criteria.

15. The device of claim 8, wherein said filtering information is present in the vertical blanking interval of a television broadcast signal.

16. The device of claim 15, wherein said filtering information is present in line 21 of the television broadcast signal.

17. The device of claim 16, wherein said filtering information is present in a text field in the VBI or in packet data, such as XDS, in the VBI.

18. The device of claim 8, wherein:

said filtering criteria includes audio filtering criteria and video filtering criteria;

said processor causes said video control device to filter the video component in response to filtering information satisfying said video filtering criteria;

the device further comprising:

an audio control device coupled to said processor and wherein said processor is configured to cause said audio control device to filter the audio component in response to filtering information satisfying said audio filtering criteria to inhibit broadcast of objectionable audio content.

19. The device of claim 18, wherein said filtering information represents a word that is present in the audio component in an encoded form.

20. The device of claim 18, wherein said filtering information includes:

information identifying a portion of the video component having violent content;

information identifying a portion of the video component having sexual content; and/or information identifying a portion of the audio component having potentially objectionable language.

21. The device of claim 18, wherein said filtering information includes information relating to an audio channel in which the objectionable content is present.

22. The device of claim 18, wherein said filtering information includes information relating to a word present in the audio component.

23. The device of claim 22, wherein said information relating to a word is compared with said audio filtering criteria in said memory to determine whether to filter the word from the audio component.

24. A method for filtering objectionable content from a signal having both audio and video components intended for viewing on a display screen, said method comprising the steps of:

storing video filtering criteria in a memory identifying disallowed video content;

receiving the signal;

extracting filtering information from said signal identifying potentially objectionable content in said signal;

determining whether said filtering information satisfies said video filtering criteria; and filtering a portion of the video component in response to determining that said filtering information satisfies said video filtering criteria so that only portions of displayed video frames corresponding to disallowed video content are obscured.

25. The method of claim 24, wherein said filtering information includes information relating to the duration the video component of said signal should be filtered in response to said filtering information satisfying said video filtering criteria.

26. The method of claim 24, wherein said filtering information includes information relating to a location in the signal said filtering should begin.

27. The method of claim 24, wherein said filtering information includes information relating to a relative time in the signal said filtering should begin.

28. The method of claim 24, wherein said filtering information includes information relating to the level of intensity of the objectionable content.

29. The method of claim 24, further including:
storing one or more words and/or word fragments in said memory identifying objectionable audio content;
extracting a closed caption signal from the signal;
comparing said closed caption signal with said words and/or word fragments stored in said memory; and
filtering the audio component in response to determining that a word in said memory is present in said closed caption signal to inhibit broadcast of disallowed audio content.

30. The method of claim 24, further comprising the step of receiving said filtering criteria from a user.

31. The method of claim 24, wherein said filtering information is contained in streaming text transmitted in conjunction with the signal.

32. The method of claim 24, wherein said filtering information is contained in a text file transmitted independently of the signal.

33. The method of claim 24, wherein said filtering information is contained in textual information embedded in or transmitted in conjunction with directory or guide information in a satellite, HDTV, or other digital television environment.

34. The method of claim 24, wherein said filtering information is contained in a metafile or sub-picture in a DVD, video CD, or other stored digital video medium utilizing MPEG or similar video and/or audio storage formats.

35. The method of claim 24, wherein said filtering information is contained in a subcarrier, FM sideband or from text data or packet data embedded in a digital radio signal.

36. The method of claim 24, wherein said filtering information is present in the vertical blanking interval of a television signal.

37. The method of claim 36, wherein said filtering information is present in line 21 of the television signal.

38. The method of claim 37, wherein said filtering information is present in a text field in the VBI or packet data, such as XDS, in the VBI.

39. The method of claim 24, further including the steps of:
storing audio filtering criteria in said memory identifying disallowed audio content;
determining whether said filtering information satisfies said audio filtering criteria; and
filtering a portion of the audio component in response to determining that said filtering information satisfies said audio filtering criteria to inhibit broadcast of disallowed audio content.

40. The method of claim 39, wherein said filtering information includes information relating to a word that is present in the signal.

41. The method of claim 39, wherein said filtering information includes data representing a word that is present in the signal in an encoded form.

42. The method of claim 39, wherein said filtering information may includes:
information identifying a portion of the video component having violent content;
information identifying a portion of the video component having sexual content; and/or
information identifying a portion of the audio component having potentially objectionable language.

43. The method of claim 39, wherein said filtering information includes information relating to an audio channel in which objectionable content is present.

44. A device for selectively filtering objectionable content from a video program intended for viewing on a screen, including a video component, comprising:
an extraction device receiving all or part of said video program and configured to extract content identifying information therefrom;
a video control device; and
a processor operatively coupled to said video control device and communicatively coupled to said extraction device for receiving extracted content identifying information; and
memory coupled to said processor and storing filtering criteria, wherein said processor is configured to cause said video control device to selectively obscure only portions of displayed video frames corresponding to objectionable video content when extracted content identifying information falls within said filtering criteria.

45. The device of claim 44, wherein said content identifying information is extracted from streaming data in the vertical blanking interval ("VBI"), or from packet data in the VBI such as extended data services ("XDS").

46. The device of claim 44, wherein said content identifying information is extracted from streaming data transmitted in conjunction with the video component.

47. The device of claim 44, wherein said content identifying information is extracted from a text file transmitted independently of the video component.

48. The device of claim 44, wherein said content identifying information is extracted from textual information embedded in or transmitted in conjunction with directory or guide information in a satellite, HDTV, or other digital television environment.

49. The device of claim 44, wherein said content identifying information is extracted from a metafile or sub-picture in a DVD, video CD, or other stored digital video medium utilizing MPEG or similar video and/or audio storage formats.

50. The device of claim 44 wherein said content identifying information defines the coordinates of the portions within the video frames.

51. The device of claim 50 wherein the portions are rectangular subregions encompassing the disallowed video content.

52. The device of claim 44 wherein said video program also includes an audio component and wherein the device further comprises:
- an audio control device, said processor being operatively coupled to said audio control device,
- wherein said memory stores a word list containing objectionable words and/or word parts,
- and wherein said processor is configured to cause said audio control device to selectively mute the audio component when the filtering criteria matches words or word parts in said word list to inhibit objectionable audio content from being broadcast.

53. The device of claim 52, wherein said word list is programmable.

54. The device of claim 53, wherein said word list is organized in blocks that can be selectively enabled or disabled to control which words or word parts a disallowed.

55. A method for filtering objectionable content from a signal having both audio and video components intended for viewing on a display screen, said method comprising:
- storing video filtering criteria in a memory identifying disallowed video content;
- receiving the signal;
- examining filtering information associated with the signal identifying potentially objectionable content in said signal;
- determining whether said filtering information satisfies said video filtering criteria; and
- filtering a portion of the video component in response to determining that said filtering information satisfies said video filtering criteria so that only portions of displayed video frames corresponding to disallowed video content are obscured.

* * * * *